July 10, 1951  M. KATZ  2,559,968
SHOCK ABSORBING DEVICE FOR VEHICLES
Filed Aug. 13, 1948
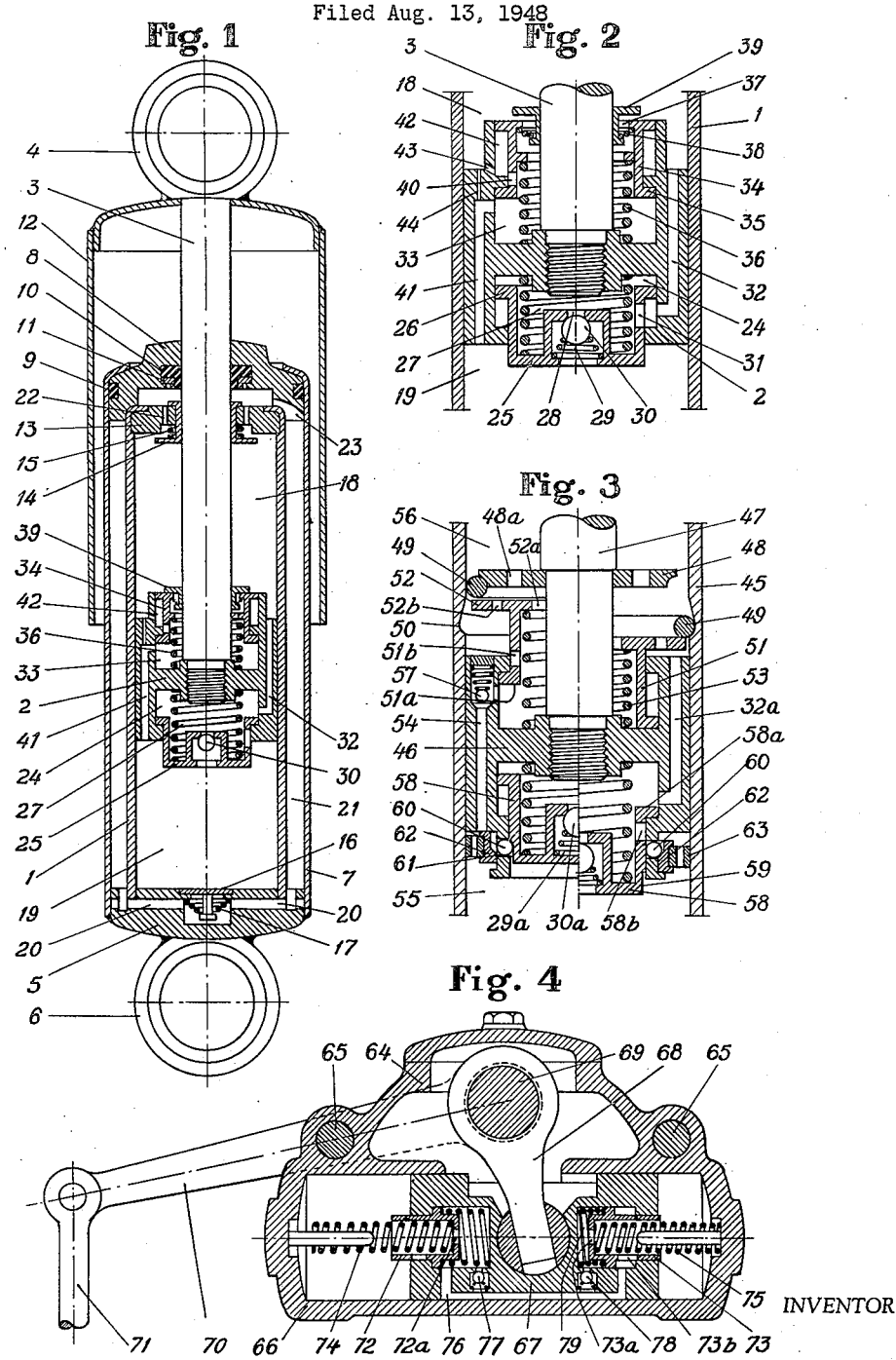
INVENTOR
Maurice Katz.
BY
Cameron, Kerkam & Sutton
ATTORNEYS

Patented July 10, 1951

2,559,968

UNITED STATES PATENT OFFICE 2,559,968

SHOCK ABSORBING DEVICE FOR VEHICLES

Maurice Katz, Neuilly-sur-Seine, France

Application August 13, 1948, Serial No. 44,055
In France October 22, 1947

15 Claims. (Cl. 188—88)

This invention relates to a shock-absorbing device for spring suspensions or similar purposes, in which a movable member adapted to receive shocks overcomes the resistance of a resilient element in order to move with respect to another member, of which it is desired to limit the movements thus generated.

The invention has for its object to provide in a system of this type a shock-absorbing device such that the suspended member returns to its position of equilibrium after having undergone the smallest possible movement from this position.

In order that this condition may be fulfilled, it is necessary first of all that the movable member which has been subjected to a shock should only transmit this shock to the suspended member with a minimum of intensity; that is to say, the effort transmitted should be limited to the value of the tension of the resilient element disposed between the said two parts, the shock-absorbing device also disposed between the said two members then offering no resistance. The disturbance in the equilibrium of the suspended member due to the deformation of the resilient element then sets up an oscillation which it is desirable to damp rapidly by means of a predetermined effort which must then be supplied by the shock absorber in setting up a suitable resistance to the movement until the suspended member has completely returned to its position of equilibrium. This resistance of the shock absorber can manifest itself, according to the case, with the same intensity in both directions of movement, or differently in each direction, or again in one direction only, and in general it can follow a given law in each direction.

In another case, for example in the case where the suspended member is called upon to receive the shock directly, the shock-absorbing device can be so arranged as to offer considerable resistance during the first movement which tends to move it to either side of its position of equilibrium, and then to offer only a reduced resistance, or no resistance at all, during the return into this position of equilibrium.

The various features of the invention will be more readily understood from the following description, which concerns the application of the shock-absorbing device to suspensions for automotive vehicles.

In the single sheet of the accompanying drawings:

Figure 1 is a sectional view of a telescopic shock absorber in its inoperative position;

Figure 2 shows on a larger scale the piston, with all the elements thereof, of the absorber shown in Figure 1 during its downward movement;

Figure 3 is a modification and shows on the left-hand side a piston of a telescopic shock-absorber in the phase of the first compression movement from the position of equilibrium, and on the right-hand side the same piston in the phase of the first movement of extension from the position of equilibrium, and Figure 4 is a sectional view of another modified embodiment applied to a shock absorber actuated by rotation of a connecting rod.

As will be seen from Figure 1, the shock absorber comprises essentially a cylinder 1 in which there is slidably mounted a piston 2 which receives through the piston rod 3 the effort transmitted by the suspended mass to an attachment 4. The cylinder rests on a base 5 connected by an attachment 6 to the movable part fixed to the wheel. A cylinder 7, which is concentric with but of larger diameter than the cylinder 1 and is secured to the base 5, has at its upper end a dome-like cap 8 rendered fluid-tight by a packing 9 and enabling the rod 3 to slide freely and in fluid-tight manner owing to the provision of a packing 10 held in position by a washer 11. A cylindrical jacket 12 connected to the attachment 4 and to the rod 3 protects the said rod.

The cylinder 1 is closed at the top by a partition 13 which is provided at its center with a valve member 14 maintained in the open position when inoperative by means of a small spring 15. Another valve member 16 situated in the base 5 of the cylinder 1 is held closed by a small spring 17 in the inoperative position.

The piston 2 divides the cylinder 1 into an upper chamber 18 and a lower chamber 19 adapted to communicate through ducts 20 with an annular compensating chamber 21 formed by the cylinders 1 and 7. Ducts 22 and 23 formed in the partition 13 and in the cap 8 establish free circulation of liquid between the chambers 18 and 21 when the valve member 14, in which the rod 3 slides, is open.

The piston 2 has in its lower part a recess 24 in which there is movably disposed a slide valve 25 retained by a flange 26 and urged constantly downwards by a spring 27. The slide valve 25 has at its center an orifice 28 closed by a ball valve 30 with the aid of a spring 29. One or more orifices 31 of suitable form and dimensions are suitably situated in the wall of the slide valve 25. The space 24 communicates with the chamber 18 through one or more ducts 32.

The upper part of the piston, which is substantially the same as the lower part, has a recess 33 in which there is disposed a slide valve 34 retained by a flange 35 and urged constantly upwards by a spring 36. An annular passage 37 in the center of the slide valve 34 is normally closed, due to the provision of a spring 38, by a valve member 39 sliding in a relatively fluid-tight manner on the rod 3. Suitable orifices 40 are situated in the side wall of the slide valve 34. The space 33 communicates with the chamber 19 through wide ducts 41. A small auxiliary annular space 42 communicating with the chamber 18 through a small orifice 43 is formed between the slide valve 34 and the upper part of the piston 2.

A small capillary orifice 44 formed in the piston 2 sets up an independent passage between the chambers 18 and 19.

This shock absorber functions in the following manner:

Under the effect of the weight of the vehicle, which may vary with the load or the fatigue of the springs, the shock absorber takes up a given position of equilibrium, such for example as that shown in Figure 1. In this inoperative position, the two slide valves 25 and 34, which are in their outermost positions, open the ducts 32 and 41. If at this moment the wheel, in travelling along the ground, encounters some obstacle, the shock absorber undergoes a sudden compression which has the effect of forcing the liquid from the chamber 19 into the chamber 18 through the wide ducts 41, by lifting the valve member 39 (Figure 2) without any great effort. The resistance thus offered by the shock absorber is therefore negligible and the suspended mass only moves a short distance from its position solely under the action of the tension of its spring, which undergoes deflection.

The slight excess of liquid in the chamber 18 due to the inward movement of the rod 3 will flow through the orifices 22 and 23 into the compensating chamber 21, while the valve member 14 which is carried along frictionally by the rod 3 and subjected to the tension of its spring 15, remains open since practically no pressure is developed in the chamber.

The lower slide valve 25, under the action of the light pressure obtaining in the chamber 19, will at the same time partly move into its recess 24 against the action of its spring 27 and the ducts 32 will be partly masked by its flange 26 and its wall in which the narrow orifices 31 are situated, as illustrated in Figure 2.

After a certain compression stroke, the movement stops and the tension of the deflected spring of the vehicle then sets up a movement of expansion. However, during the short period of stoppage, the valve member 39 falls back on to its seat and thus interrupts the free circulation of liquid between the chambers 19 and 18, leaving only a small passage through the capillary orifice 44. The slide valve 25 consequently cannot return to its initial position. As a result, the movement of expansion commences with the slide valve 25 substantially in the same position (Fig. 2) and the liquid, maintained under pressure in the chamber 18, closes the valve member 14 and passes into the chamber 19 only through the ducts 32 and the throttled orifices 31 by opening the ball valve 30.

The slide valve 25 will take up a position which will correspond to the equilibrium of the existing forces, that is to say, of its spring 27 and of the pressure obtaining in the chamber 18 which will be exerted on the annular surface of its flange 26. This position of the slide valve will correspond to a given opening of the orifices 31, depending on the section of these orifices that remains uncovered, whereby a suitable braking force will be imparted to the shock absorber. It will, in fact, readily be seen that suitable choice of the spring 27 and of the cross-sectional area of the orifices 31 will give to the shock absorber a resistance which follows a definite law and which is proportional in the case of automotive vehicles, for example, to the speed of the piston 2.

In the movement of expansion, which thus takes place with a definite shock-absorbing force, the slide valve 34 will in turn be armed in a similar manner by being forced inwards under the pressure obtaining in the chamber 18, so as to produce during the following movement in the opposite direction a throttling of liquid through the orifices 40 and thus to insure braking at compression. A portion of the liquid from the chamber 21, corresponding to the volume of the rod 3 which has travelled outwards during this movement of expansion, will return into the chamber 19 through the duct 20, lifting the valve 16 against the action of its spring 17. The movement of compression will in turn again arm the slide valve 25, which acts on the next expansion, and so on until the oscillatory movement has completely died down. The two slide valves 25 and 34 cannot, in fact, return into their initial position until the movement has stopped, that is to say until the suspended mass has returned into the position of equilibrium.

The braking can, moreover, be different in the two directions. Since, in addition, the slide valves function independently of one another, it is also possible to provide only one slide valve if it is only desired to modify the resistance of the shock absorber in one of its two directions of operation.

Moreover, in certain embodiments, the provision of the valves, such as 16 and 14, and above all the insufficient level of liquid in the chamber 18 which manifests itself after the apparatus has been in use a long time, may compromise the retention of the slide valves in their closing position during the brief period occupied by the change in direction of the movement, and it may therefore be more advantageous to provide these slide valves with an auxiliary chamber, such as 42, having a small capillary orifice 43. This small chamber 42 could in itself serve to regulate the time for the return of the slide valve 34 to the initial position, and in this case the flange 35 of the said slide valve would no longer be required. However, the adjustment of the resistance of the shock absorber would in such a case be less convenient.

It will also be seen from the foregoing that if the orifices 28 and 31 bear a suitable relationship to the orifices 37 and 40, greater resistance may be imparted to the shock absorber when the suspended mass moves away from the position of equilibrium as a result of a disturbance, while lower resistance may be imparted to the shock absorber when the suspended mass returns to this position of equilibrium, which may be of advantage in certain cases of oscillatory phenomena. It is also possible to obtain one result in one direction of movement and the opposite result in the inverse direction of movement of the shock absorber.

In another example of embodiment of the invention, which also concerns a telescopic shock absorber for automotive vehicles and is illustrated in Figure 3, only the arrangement of the obturating devices differs from that in the preceding example. In particular, mechanical locking devices can be employed to hold the slide valves in their inner or armed positions during the periods of stoppage of the piston as its direction of travel is being reversed, one such means being shown at the lower side of the piston in Fig. 3; also the arming of the slide valves can be accomplished mechanically by causing them to engage devices which slide frictionally along the inner wall of the cylinder and which are set initially at appropriate points with respect to the neutral position of the piston, one such device being shown at the upper side of the piston shown in Fig. 3.

In the inner cylinder 45 is movably arranged a piston 46 secured to the rod 47 which is integral with the suspended mass. Secured to the rod 47 is a collar 48 which drives in its downward movement a ring 49 which is preferably in the form of an extensible split ring of circular wire so as to be able to slide with friction on the inner face of the cylinder 45 and then to be retracted by the collar 48 into a groove 50 formed in the cylinder 45. The upper slide valve 51, which is similar to the slide valve 34 hereinbefore described, is in addition provided with a collar 52 which, during the upward movement of the piston 46, encounters the ring 49 and carries it along in its movement, which compressing its spring 53. This engagement moves the slide valve 51 into its recess so that it is armed mechanically instead of by liquid pressure as in Fig. 1, and accordingly it is unnecessary to provide check valves in the location of the valves 30 and 39 of Fig. 1. The conduit 54, which establishes communication between the lower chamber 55 and the upper chamber 56 and corresponds in this respect with the conduit 41 of Fig. 1, is provided with a ball valve 57 which prevents flow of liquid from chamber 56 to chamber 55.

The lower slide valve 58 of the piston 46 is similar in all respects to the slide valve 25 of Figures 1 and 2, but its lower extremity 59 is of reduced diameter to enable it to be locked in the obturating position by balls 60 lodged in recesses 61 formed in the body of the piston 46.

A ring 62 comprising leaf springs 63, one end of which is fixed to said ring while the opposite or free end rubs against the inner face of the cylinder 45, forces the balls 60 into the reduced extremity 61 of the slide valve 58 when the said slide valve has been forced into its obturating position by the pressure obtaining in the chamber 55 during a movement of compression of the shock absorber.

The shock absorber therefore functions in the following manner:

The suspended mass being situated in its inoperative position, the slide valves 51 and 58 are in their outermost positions and a downward movement of the piston 46 (left-hand side of Figure 3) corresponding to the pressure of the spring of the vehicle, which is produced, for example, by the vehicle passing over an obstacle, does not produce any reaction of the shock absorber because the liquid passes, in fact, freely from the chamber 55 through the duct 54 and the ball valve 57 into the slide valve recess in the upper side of the piston, through the opening 52a in the head of the slide valve and the ports 48a in the collar 48, and into the chamber 56.

The collar 48, after having carried the extensible ring 49 into its groove 50 and having then left it, passes freely through the said ring 49.

The lower slide valve 58 is forced inwards in its recess during the compression stroke, the ball check 30a being held closed against the force of its spring 29a owing to the light pressure obtaining in the chamber 55, so that the balls 60, thrust by the ring 62 which is in turn retained by the friction of its resilient members 63 against the wall of the cylinder 45, lock the said slide valve 58 in its inward or armed obturating position. During the period when the piston 46 is stationary at the end of its compression stroke, regardless of the duration of said period, the slide valve 58 will remain locked in position and will thus be able to come into action during the return movement, during which it will remain in its obturating position, although being unlocked, owing to the action of the pressure which it will have assisted in creating in the chamber 56. That is, during this return movement the liquid cannot pass through the conduit 54 but passes instead through the ports 52b of the collar 52 into the duct 32a which opens into the slide valve recess in the lower side of the piston. This opening, however, is masked by the flange 58a and by the side wall of the slide valve 58 (compare lower half of Fig. 2) so that the liquid must pass through the narrow orifices 58b into the interior of the slide valve and thence past the ball check 30a to the chamber 55. The pressure of the liquid against the flange 58a holds the slide valve in position as described with reference to Figs. 1 and 2. The shock absorber will thus offer considerable resistance to the movement of expansion of the spring of the vehicle which was previously deflected. During this return movement, moreover, the upper slide valve is armed by engagement with the ring 49, so that if the shock is not completely damped and there should be another compression stroke, the flange 51a and the side wall of the slide valve will mask the opening of the conduit 54 and the liquid must pass through the narrow orifices 51b.

If, on the other hand, the wheel of the vehicle encounters a depression in its path of movement, the spring of the vehicle, which is assumed to be in its position of equilibrium at this moment, will set up a movement of expansion of the shock absorber or, what amounts to the same, will tend to cause the piston 46 to rise. The slide valve 58, having been released at the cessation of the preceding oscillatory movement, will be moved to its outermost position. The liquid therefore flows freely through the ports 48a and the duct 32a into the slide valve recess in the lower side of the piston and thence past the ball check valve 30a to the chamber 55. The shock absorber will therefore not offer any resistance to this movement and the vehicle, thus supported by the still substantial tension of its spring, will thus not fall with its full weight. The deflection thus assumed by its spring will be much less than if this movement of expansion were braked. Moreover, during the movement of expansion the slide valve 51 (right-hand side of Figure 3) encounters the ring 49 at a point in its movement, the location of which depends on the location of the groove 50. This groove can be located a considerable distance from the neutral or inoperative position of the piston, so as to permit substantial travel of the piston from neutral position without arming the slide valve, but is shown for example at the point corresponding to the inoperative position.

Thus the collar 52 engages the ring as soon as the piston leaves its neutral position and drives the said ring 49 from its groove 50, the slide valve being returned into its inner position so that when the vehicle falls and brings about a movement of compression of the suspension, the shock absorber will be re-armed and will offer resistance to this compression since the liquid passes from chamber 55 through the conduit 54 and the orifices 51b to the chamber 56. The pressure of the liquid against the flange 51a again holds the slide valve in position. The amplitude thus assumed by the movement will be considerably reduced.

It will be seen that the distance which the piston must travel from neutral position before being armed to resist return movement depends on the location of the groove 50, and that if the ring 49 and groove 50 are duplicated on the two sides of the piston, the shock absorber will not be armed for shorter travel of the piston in either direction.

Finally, a third practical example of embodiment of the invention is illustrated in Figure 4.

The body of the shock absorber 64, secured to the vehicle by bolts 65, comprises a cylinder 66 in which there is movably arranged a piston 67 driven with the aid of a finger 68 connected to a pin 69 which receives its rotational movement through a connecting rod 70, which is in turn connected by a rod 71 to the wheel of the vehicle. Two slide valves 72 and 73 insure the operation of the device as in the preceding cases.

However, the arming of the slide valves is effected by means of stops, preferably powerful springs 74 and 75, which bear against the ends of the cylinder 66 as soon as the position of equilibrium is departed from in either direction.

The slide valves 72 and 73 being open at their center, the recesses in which they are housed can be joined by a single duct 76 having branched therefrom two ball valves 77 and 78 which insure communication between the two chambers situated on either side of the piston 67.

It will readily be understood that with mechanical stops of this nature (springs or even friction rods and the like), the maintenance of a slide valve in its obturating position is insured during the return movement to the point at which contact with the stop is lost. It is therefore possible also to employ smooth slide valves, that is to say slide valves having no flange, of which the surface exposed to the hydraulic pressure has the particular object of maintaining the said slide valve in its obturating position. However, in the latter case, the braking force of the shock absorber will subsist only in each return movement and only up to the point of equilibrium.

Referring to Fig. 4, when the piston moves from its neutral position in either direction, for example to the right, the absorber offers little resistance because liquid flows freely from the right-hand end of the cylinder through the aperture 73a in the bottom of the slide valve and past the ball valve 78 into the duct 76. As the valve 73 is moved inwardly to the position shown in Fig. 4, some of the liquid may also pass through the side wall orifices 73b to the duct 76. Meanwhile, the left-hand slide valve 72 is in its outermost position so that the end of the duct 76 is uncovered and the liquid passes into the slide valve recess and through the aperture 72a in the bottom of the slide valve to the left-hand end of the cylinder. As soon as the piston reverses its movement, however, liquid can flow back to the right-hand end of the cylinder only through the orifices 73b, since the ball valve 78 is now closed. The slide valves remain in these positions until the piston reaches its neutral position. Slide valve 73 is now released and is moved outwardly by its spring. If movement of the piston continues beyond neutral position, the valve 73 assumes a position like that of the valve 72 as shown in the drawing, and valve 72 is forced inward by spring 74 against its spring 80 to a position corresponding to that of the valve 73 as shown in the drawing. The valve 72 is thus armed for return movement of the piston to neutral position.

The invention is obviously not limited to the forms of embodiment illustrated and described by way of example, since various modifications in construction may be made without departing from the scope thereof.

Having now particularly described and ascertained the nature of my said invention and in what manner the same is to be performed, I declare that what I claim is:

1. A hydraulic shock absorber comprising a cylinder, a piston movable axially in said cylinder and dividing it into two liquid chambers, said piston having on one side a recess with a port in its side wall, a slide valve movable axially in the recess and having a valve passage leading from said recess to the adjacent chamber and a side wall orifice communicating with said valve passage and located to register with said port when said slide valve is moved inwardly in said recess, resilient means normally maintaining said valve outwardly and uncovering said port, said valve being movable inwardly against said resilient means on the initial stroke of the piston toward said one side to register its side wall orifice with said port, and duct means providing a first passage from said one side through the piston for passing liquid as the piston moves toward said one side only and a second passage from the other side of the piston to said port for passing liquid through said orifice when the piston returns in the opposite direction, said orifice restricting the flow of liquid through said second passage when said piston moves in said opposite direction.

2. A hydraulic shock absorber comprising a cylinder, a piston movable axially in said cylinder and dividing it into two liquid chambers, said piston having on one side a recess with a port in its side wall, a slide valve movable axially in the recess and having a valve passage leading from said recess to the adjacent chamber and a side wall orifice communicating with said valve passage and located to register with said port when said slide valve is moved inwardly in said recess, resilient means normally maintaining said valve outwardly and uncovering said port, said valve being movable inwardly against said resilient means on the initial stroke of the piston toward said one side to register its side wall orifice with said port, and duct means for passing liquid through the piston and comprising a first passage through the piston for passing liquid as said piston moves toward said one side, a check valve for closing said first passage on the return movement of the piston, and a second passage leading from the other side of said piston to said port and orifice for passing liquid during said return movement, said orifice restricting the flow of liquid through said second passage during said return movement.

3. A shock absorber according to claim 1, said slide valve having a check valve for closing the valve passage on movement of said piston and valve toward said one side, whereby the valve is moved inwardly during said initial stroke.

4. A shock absorber according to claim 1, said slide valve having a surface exposed to the pressure in said second passage for holding said valve in its inward position during said movement of the piston in the opposite direction.

5. A shock absorber according to claim 1, said slide valve having a recess, a locking device adapted to enter said recess when the slide valve is moved inwardly, and means actuated by relative movement between said piston and cylinder for moving said device into locking position.

6. A shock absorber according to claim 5, said locking device comprising a ball and said actuating means having frictional engagement with said cylinder and being mounted on said piston for axial movement relative thereto.

7. A shock absorber according to claim 1, including a slide valve actuating device having slidable frictional engagement with the wall of said cylinder, said device being engaged by said slide valve when said piston moves in said opposite direction for moving said slide valve inwardly in its recess.

8. A shock absorber according to claim 7, said device comprising an expansible ring movable axially in one direction in the cylinder by said piston, the cylinder wall having a groove into which said ring expands at a predetermined point, said piston having a member engaging and moving said ring axially to said groove and then moving through the expanded ring, said slide valve having a part engaging the ring when expanded in said groove.

9. A shock absorber according to claim 1, including a stop carried by said valve and adapted to engage said cylinder at a predetermined point to move said valve inwardly in its recess.

10. A shock absorber according to claim 9, said stop comprising a spring.

11. A hydraulic shock absorber comprising a cylinder, a piston movable axially in said cylinder and dividing it into two liquid chambers, said piston having recesses in both sides and each recess having a port in its side wall, slide valves movable axially in said recesses and each having a valve passage leading from its recess to its adjacent chamber and a side wall orifice communicating with said passage and located to register with said orifice when said slide valve is moved inwardly in said recess, resilient means normally maintaining said valves outwardly and uncovering said ports, said valves being movable inwardly on the initial strokes of the piston toward their respective sides to register their side wall orifices with said ports, and duct means providing a first passage through the piston from either side of the piston toward which it moves for passing liquid only when the piston makes its initial stroke in either direction and a second passage from either side of the piston toward which it moves to the port on the opposite side for passing liquid through said orifices on subsequent strokes of the piston, said orifices restricting the flow of liquid through said second passages during said subsequent piston strokes.

12. A hydraulic shock absorber comprising a cylinder, a piston movable axially in said cylinder and dividing it into two liquid chambers, said piston having recesses in both sides and each recess having a port in its side wall, slide valves movable axially in said recesses and each having a valve passage leading from its recess to its adjacent chamber and a side wall orifice communicating with said passage and located to register with said port when said slide valve is moved inwardly in said recess, resilient means normally maintaining said valves outwardly and uncovering said ports, said valves being movable inwardly on the initial strokes of the piston toward their respective sides to register their side wall orifices with said ports, and duct means for passing liquid through the piston and comprising first passages through the piston for passing liquid therethrough from either side toward which said piston makes its initial stroke, check valve means for closing said first passages on subsequent strokes of the piston, and second passages leading from both sides of said piston to said ports and orifices on the opposite sides for passing liquid during such subsequent strokes, said orifices restricting the flow of liquid through said second passages during said subsequent strokes.

13. A hydraulic shock absorber comprising a cylinder, a piston movable axially in said cylinder and dividing it into two liquid chambers, said piston having recesses in both sides and each recess having a port in its side wall, slide valves movable axially in said recesses and each having a valve passage leading from its recess to its adjacent chamber and a side wall communicating with said passage and located to register with said orifice when said slide valve is moved inwardly in said recess, resilient means normally maintaining said valves outwardly and uncovering said ports, said valves being movable inwardly on the initial strokes of the piston toward their respective sides to register their side wall orifices with said ports, ducts leading from both sides of the piston through the piston and through the ports and valve passages of the outwardly positioned valves on the opposite sides of the piston, said ducts providing a first liquid passage through one of said ports and its associated valve passage during the initial stroke of the piston in either direction, check valves in said ducts for closing said first passage during the initial return stroke of the piston, said slide valves being moved inwardly on said initial stroke and initial return stroke and said ducts then providing further liquid passages in both directions through the orifices of the inwardly moved slide valves for passing liquid during piston strokes subsequent to said initial stroke, said orifices restricting the flow of liquid through said further passages during said subsequent piston strokes.

14. A hydraulic shock absorber comprising a cylinder, a piston movable axially in said cylinder and dividing it into two liquid chambers, said piston having recesses in both sides and each recess having a port in its side wall, slide valves movable axially in said recesses and each having a valve passage leading from its recess to its adjacent chamber and a side wall orifice communicating with said passage and located to register with said orifice when said slide valve is moved inwardly in said recess, resilient means normally maintaining said valves outwardly and uncovering said ports, said valves being movable inwardly on the initial strokes of the piston toward their respective sides to register their side wall orifices with said ports, check valves for closing the valve passages through each slide valve as the piston moves toward the side in which the valve is located, and ducts leading from both sides of the piston through it and to the ports and recesses on its opposite sides.

15. A hydraulic shock absorber comprising a cylinder, a piston movable axially in said cylinder and dividing it into two liquid chambers, said piston having recesses in both sides and each recess having axially spaced side wall ports, slide valves movable axially in said recesses and each having a valve passage leading from its recess to its adjacent chamber and a side wall orifice communicating with said passage, resilient means normally maintaining said valves outwardly and uncovering both ports, said valves being movable inwardly on the initial strokes of the piston toward their respective sides and to inner positions in which the inner ports remain uncovered and the outer ports register with said side wall orifices, a duct connecting the two outer ports and having branch ducts to said inner ports, and check valves in said branch ducts each adapted to close when liquid flows thereto from the opposite side of the piston.

MAURICE KATZ.

REFERENCES CITED

The following references are of record in the file of this patent:

UNITED STATES PATENTS

| Number | Name | Date |
|---|---|---|
| 2,106,461 | Leslie | Jan. 25, 1938 |
| 2,161,811 | Grebe | June 13, 1939 |
| 2,224,305 | Krueger | Dec. 10, 1940 |
| 2,239,112 | Nickelsen | Apr. 22, 1941 |
| 2,352,063 | Zenz | June 20, 1944 |
| 2,379,750 | Rossman | July 3, 1945 |